Patented July 23, 1946

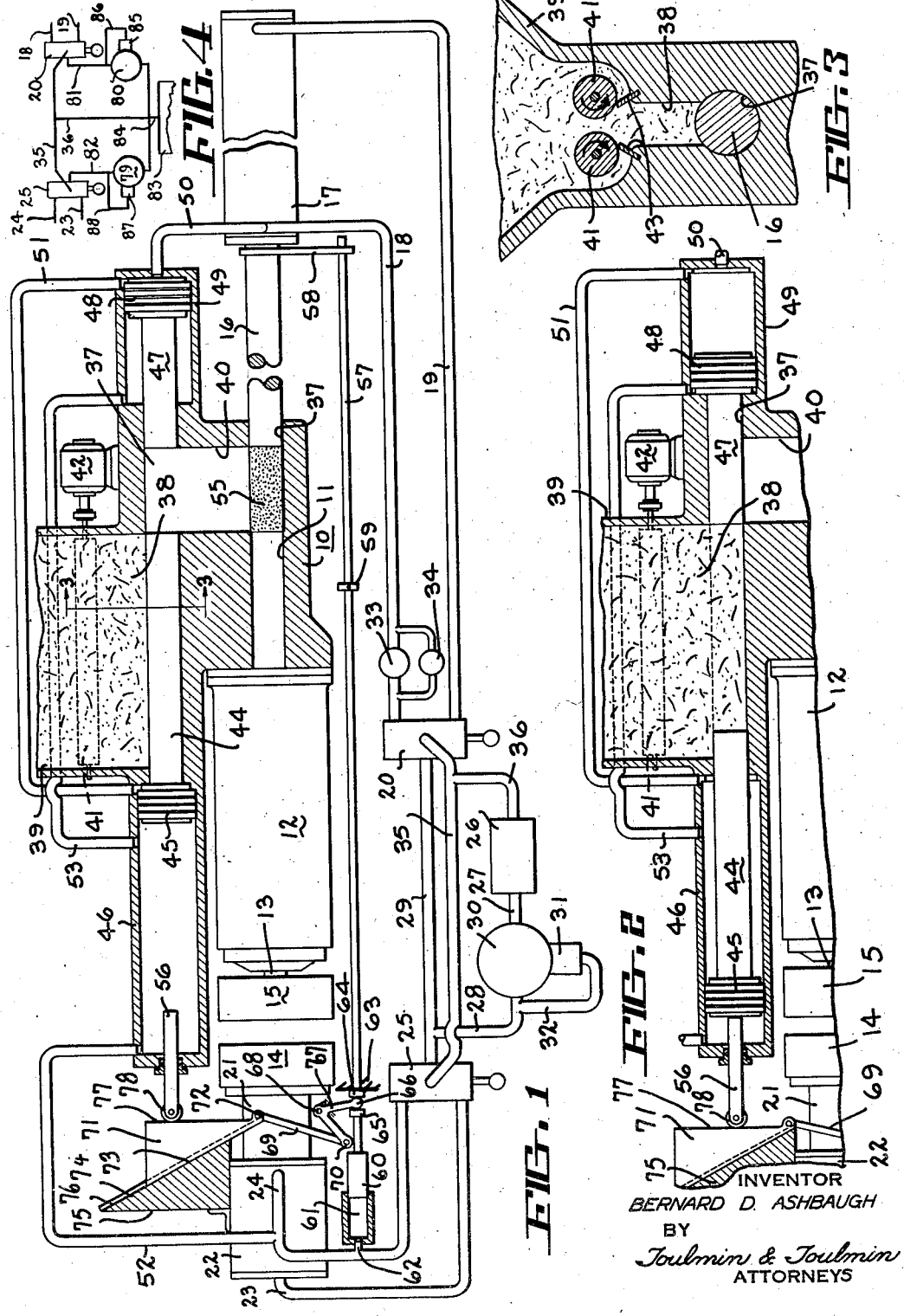

2,404,559

UNITED STATES PATENT OFFICE 2,404,559

PLASTIC SLUG FORMING AND FEEDING MECHANISM

Bernard D. Ashbaugh, Mount Gilead, Ohio, assignor to The Hydraulic Development Corp., Inc., Wilmington, Del., a corporation of Delaware Application July 26, 1943, Serial No. 496,170

10 Claims. (Cl. 18—30)

This invention relates to injection machines, and particularly to a machine wherein preformed and compressed charges of plastic material can be produced for delivery into the injection chamber of the machine.

An object of the invention is to provide a combination pellet or briquette forming machine and injecting machine.

Another object of the invention is to provide the combination machine in accordance with the foregoing object wherein the preformed and compressed charges of plastic material are produced in such a manner that the quantity of material in each charge of plastic material is gauged according to the quantity of material that is ejected from the injection cylinder.

Another object of the invention is to provide a combination machine for forming pellets or briquettes of flock material that are subsequently fed to the injection cylinder of the machine for use in an injection molding process.

Another object of the invention is to provide an injection machine that is adapted to operate upon a continuous cycle of operation wherein preformed pellets or briquettes of plastic material are fed into the injection chamber of the machine having predetermined quantities of plastic material in each of the preformed charges gauged according to the volume of material ejected from the injection cylinder so that there will always be a substantially constant quantity of plastic material remaining in the injection cylinder after each cycle of operation whereby to insure complete filling of a mold or to gradually elevate the temperature of a plurality of charges of plastic material as they pass through the injection cylinder for ejection therefrom into a mold.

Still another object of the invention is to provide a combination pellet or briquette forming injection machine wherein the pellets or briquettes are formed in the machine during the period when the injection plunger is on a retraction stroke and the mold associated with the injection cylinder is opened.

Another object of the invention is to provide a combination pellet or briquette forming and injection machine wherein the operation of the briquette forming portion of the machine to regulate the size of the briquette formed is controlled by a mechanism actuated in response to the movement of the injection plunger so that the pellets or briquettes formed in the machine contain substantially the same quantity of plastic material that was ejected by the injection plunger during a stroke of operation thereof.

Still another object of the invention is to provide a combination pellet or briquette forming and injection machine wherein the push-back pressure for the injection plunger operates the pellet forming apparatus so that plastic material can be delivered into the pellet forming apparatus, and wherein the push-back pressure for the molds of the machine is used for compressing a charge of plastic material into a pellet of a predetermined size and for feeding the formed pellet or briquette into the injection chamber of the machine.

Further objects and advantages will become apparent from the drawing and the following description.

In the drawing:

Figure 1 is a diagrammatic illustration, partially in cross section, of a machine and hydraulic system incorporating the features of this invention.

Figure 2 is a view of a portion of the apparatus shown in Figure 1 to illustrate the position of the briquette forming apparatus when plastic material is being fed thereto.

Figure 3 is a transverse cross sectional view taken along line 3—3 of Figure 1.

Figure 4 is a diagrammatic illustration of a modified arrangement of hydraulic system that can be used in co-operation with the machine illustrated in Figure 1.

In this invention the combination briquette forming and injection machine consists of a body 10 having an internal bore 11 that aligns with the internal bore of an injection cylinder 12, the injection cylinder 12 being suitably secured to the body 10. The injection cylinder 12 may be heated in any conventional manner to raise the temperature of plastic material as it passes therethrough in order to plasticize the same and place it in condition for ejection through a suitable nozzle 13 into the mold members 14 and 15 when the mold members are in closed position.

An injection plunger 16 is connected to and is operated by a double-acting hydraulic motor 17 that has conduits 18 and 18 for supplying fluid under pressure to opposite ends of the hydraulic motor 17 in accordance with the setting of the 4-way valve 20.

The mold 14 is moved toward and away from the mold 15 by means of a ram 21 that extends from a double-acting hydraulic motor 22. Conduits 23 and 24 are connected to opposite ends of the hydraulic motor 22 for supplying fluid under pressure to the motor as controlled by a 4-way valve 25.

A pump 30 is connected to a reservoir 26 by means of a conduit 27 to draw fluid from the reservoir and for supplying the same to a pressure line 28 that connects with a supply line 29 connected to the inlet side of the 4-way valves 20 and 25. The pump 30 may be any conventional fluid pump that is adapted to produce pressure and which may be regulated to determine the maximum pressure that will be produced by the pump 30 in the supply line 28. One form of conventional pump is the well-known variable delivery constant pressure pump that is provided with a control mechanism 31 that is connected with the supply line 28 by means of a conduit 32 for regulating the operation of the pump 30 whereby to control the maximum pressure delivered by the pump 30. Such variable delivery constant pressure pumps are well-known in the art and will not be further disclosed.

The 4-way valve 20 for controlling the flow of fluid to the hydraulic motor 17 is connected to the conduits 18 and 19, respectively for supplying fluid to these conduits according to the setting of the valve. A pressure reducing valve 33 is provided in the conduit 18 whereby the pressure in the conduit between the valve 33 and the hydraulic motor 17 will be less than the pressure in the supply conduit 29 that is passed through the valve 20. A check valve 34 is arranged to by-pass the pressure reducing valve 33 when fluid is to flow through the conduit 18 to the reservoir. The 4-way valves 25 and 20 are connected to the reservoir 26 by means of the conduits 35 and 36 to conduct fluid to the reservoir from either end of the hydraulic motors 17 and 22 in accordance with the setting of the 4-way valves in conventional manner as well-known in the art.

The apparatus for preforming briquettes of plastic material for feeding to the injection cylinder 12 of the injection machine consists of a cylindrical bore 37 that has a vertically arranged feed opening 38 communicating with a material hopper 39. The cylindrical bore 37 communicates with an opening 40 that in turn communicates with the cylindrical bore 11 that receives the injection plunger 16 whereby a briquette formed in the cylindrical bore 37 may be fed into the cylindrical bore 11 for transfer into the injection cylinder 12.

A pair of rollers 41 are reversely rotated by means of an electric motor 42, in the direction of the arrows on the rollers 41, whereby plastic material in the hopper 39 is fed downwardly through the feed opening 38 into the bore 37 for filling the same. Scrapers 43 are provided for the rollers 41 to prevent the plastic material from following the rotation of the rollers and for causing the material to advance into the feed opening 38.

A plunger or ram 44 reciprocates in the bore 37 and is provided with a piston head 45 that reciprocates in the cylinder 46. A second plunger or ram 47 spaced from the plunger or ram 44, also reciprocates in the bore 37 and has a piston head 48 that reciprocates in the cylinder 49.

A conduit 50 connects with the conduit 18 whereby pressure fluid that is applied to the push-back side of the injection motor 17 is applied to the right-hand end of the piston head 48 for advancing the piston in a manner to be hereinafter described. A conduit 51 connects the right-hand end of the cylinder 49 with the right-hand end of the cylinder 46 whereby pressure fluid that is supplied to the cylinder 49 from the conduit 50 will be also supplied through the conduit 51 to the right-hand end of the piston 45 to advance the same in a leftward direction in a manner hereinafter described.

A conduit 52 connects with the conduit 24 that supplied fluid to the push-back side of the mold operating motor 22 whereby pressure fluid will be supplied through the conduit 52 to the left-hand end of the cylinder 46 when fluid under pressure is supplied to the push-back side of the hydraulic motor 22. A conduit 53 connects with the cylinder 46 at a point intermediate between the left and right-hand ends of the cylinder and is uncovered by the piston 45 when the same moves to the right-hand end of the cylinder 46 so that the push-back pressure admitted into the cylinder 46 through the conduit 52 will be supplied through the conduit 53 into the left-hand end of the cylinder 49 for moving the piston 48 in a rightward direction in a manner to be hereinafter described.

The operation of the apparatus thus far described will be as follows: Referring to Figure 1, and assuming that the machine has been previously dropped a preform or briquette through the feed opening 40 into the bore 11, the machine is now ready for an injection stroke.

The pump 30 is, of course, in operation and ready to supply fluid under pressure whenever one of the 4-way valves 20 and 25 is shifted. The 4-way valve 25 will be first shifted so that fluid under pressure will be supplied from the conduit 29 into the conduit 23 thereby closing the mold 14 upon the mold 15 and clamping the same in closed position.

The 4-way valve 20 is then shifted so that fluid under pressure will be supplied from the conduit 29 to the conduit 19 thereby causing the injection plunger 16 to move through an advancing stroke to move the briquette 55 forwardly into the cylinder bore 11 and force plastic material from the injection cylinder 12, that has previously been heated therein in conventional manner, into the molds 14 and 15.

Upon completion of the injection stroke of the injection plunger 16, the 4-way valve 20 will be shifted to supply fluid under pressure from the conduit 29 into the conduit 18 to cause retraction of the injection plunger 16. The fluid under pressure supplied to the push-back side of the hydraulic motor 17 to retract the injection plunger 16 will also be supplied through the conduits 50 and 51 to the right-hand ends of the cylinders 49 and 46 whereby to move the pistons 48 and 45 in a leftward direction. The piston 48 will bottom upon the end of the cylinder 49 in the manner illustrated in Figure 2, while the piston 45 will abut against a stop member 56 that is provided in the left end wall of the cylinder 46, and will be hereinafter described.

The electric motor 42 is, of course, operating continuously to rotate the rollers 41 so that when the plunger 44 moves in a leftward direction the plastic material in the hopper 39 will be moved downwardly into the cylinder bore 37 as the plunger 44 retracts in a leftward movement. The plunger 47 carried by the piston 48 will stop in a position to close the left-hand end of the feed opening 40 from the cylinder bore 37, the plungers 44 and 47 thus being in the position as illustrated in Figure 2.

It will be remembered that all of this foregoing operation will be performed during the retraction stroke of the plunger 16.

The reducing valve 33 provides a pressure reduction between the line 29 and the line 18 so that the pressure in the line 18 will always be below the maximum pump pressure that stands in the supply line 29 for reasons which will hereinafter become apparent.

When the injection plunger 16 begins its retraction stroke the 4-way valve 25 is shifted whereby fluid under pressure is conducted from the supply line 29 to the conduit 24 to be applied upon the push-back side of the mold operating motor 22 thereby withdrawing the mold 14 from the mold 15 to permit ejection of the article that has been cast or molded therein. The pressure in the line 22 will also be supplied through the conduit 52 to the left-hand end of the cylinder 46, it being remembered that at this time the pistons 45 and 48 will be in a position illustrated in Figure 2 as the result of the previous application of the push-back pressure from the injection motor 17 being supplied to the right-hand ends of these pistons as previously described.

With the push-back pressure from the mold operating hydraulic motor 22 being supplied to the left-hand end of the piston 45, the piston will move in a rightward direction to compress the plastic material that will be retained between the ends of the plungers 44 and 47. The compression of the plastic material will continue until the pressure on the plastic material is sufficient to overcome the push-back pressure in the right-hand end of the cylinder 49, it being remembered that the pressure reducing valve 33 maintains the pressure in the push-back line 18 below pump pressure that is being supplied through the conduit 52. The compressed charge of plastic material between the ends of the plungers 44 and 47 will be moved in a rightward direction under this compression until the piston 45 uncovers the conduit 53 to permit the push-back pressure in the conduit 52 and cylinder 46 to enter the conduit 53 and thereby supply the same pressure to the left-hand end of the piston 48. When this occurs, both plungers 44 and 47 will move in a rightward direction at the same speed so that the briquette of plastic material that has been formed between the plungers will be brought into alignment with the feed opening 40 and will thereby drop through the feed opening 40 upon the top of the injection plunger 16 if the injection plunger has not completed its retraction stroke. As soon as the injection plunger completes its retraction stroke, whereby the plunger will be in the position as illustrated in Figure 1, the briquette 55 will drop into the cylinder bore 11 and thus the machine will be ready for another cycle of operation.

The stop member 56 is a part of a mechanism for regulating the rearward position of the piston 45 whereby to control the quantity of plastic material that is disposed between the plungers 44 and 47 when they are in the position, as illustrated in Figure 2, the mechanism associated with the stop 56 being provided to regulate the size of the briquette in accordance with the quantity of plastic material that is ejected from the injection cylinder 12 upon each stroke of operation of the injection plunger 16 so that there will always be a predetermined quantity of plastic material remaining in the injection cylinder 12 after each stroke of operation of the injection plunger, variations within a practical limit, of course, being allowable.

The stroke control mechanism for the plunger 44 consists of a rod 57 that has one end thereof extending through an arm 58 that is secured to the injection plunger 16, the arm 58 sliding over the rod 57 upon forward movement of the injection plunger. A collar 59 is secured to the rod 57, as by means of a set screw, that is engaged by the arm 58 when the plunger 16 strokes in a forward direction. If the quantity of plastic material in each of the briquettes that is fed into the cylinder bore 11 remains constant, the arm 58 will just strike the collar 59 but will cause no movement of the rod 57. However, such conditions are not obtainable in practice because the density of plastic material fed into the cylinder bore 37 varies somewhat, so that the length of the briquette formed between the plungers 44 and 47 varies upon each operation of the briquette forming apparatus.

The opposite end of the rod 57 carries a piston 60 that operates in a cylinder 61 that communicates with the push-back pressure line 24 of the mold operating motor 22 by means of the conduit 62 whereby the piston 60 will be moved into the outward position against a stop 63 that is engaged by the collar 64 when push-back pressure stands in the line 24.

The rod 57 is also provided with another collar 65 associated with the collar 64 that receives a yoke 66 therebetween that is on one end of a bell crank lever 67 pivoted by means of a pin 68. The opposite end of the bell crank lever receives one end of an arm 69 pivoted thereto by means of a pin 70, the opposite end of the arm 69 being pivoted to a stroke control member 71 by means of a pin 72.

The stroke control member 71 is provided with an angularly inclined surface 73 that engages a similarly inclined surface 74 provided on a support member 75, suitable guide tracks 76 being provided between the support 75 and the control member 71 to guide the same in sliding movement. The stroke control member is provided with a vertical face 77 that is engaged by a roller 78 provided on the end of the stop member 56. By regulating the position of the stop member 56 it will be apparent that the rearward position of the plunger 44 can be controlled to vary the space between the plungers 44 and 47 and thus regulate the quantity of plastic material fed between these members and compressed into a briquette.

As previously mentioned, if the arm 58 does not cause movement of the collar 59 there will be no operation of the stroke control apparatus. However, when the arm 58 strikes the collar 59 toward the end of the injection stroke and moves the same in a leftward direction, thereby moving the rod 57, the bell crank lever 67 will be rotated in a clockwise direction to move the stroke control member 71 upwardly along the inclined surface 74 and thereby permit movement of the stop member 56 when the piston 45 strikes the same upon a return movement thereof and thus increase the space between the plungers 44 and 47 to increase the quantity of plastic material fed between the same and thereby form a larger briquette on this particular stroke of operation of the apparatus.

When the push-back pressure is applied to the motor 22 through the conduit 24, the same pressure will be applied within the cylinder 61 to move the piston 60 in a rightward direction until the collar 64 strikes the stop 63 and thereby reposition the collar 59 on the rod 57 to its initial starting position.

The location of the collar 59 on the rod 57 is governed wholly by the quantity of plastic material that is required to fill the mold cavities so that if the quantity required to fill the mold cavities should be less in some instances than others the position of the collar on the rod 57 will be changed so that the initial starting position of the collar 59 will thus vary according to the quantity of plastic material that is to be forced into the mold cavity.

While the principal description has been in connection with the use of a single pump and the use of a pressure reducing valve to establish a pressure differential between the push-back pressure applied to the injection hydraulic motor 22, yet this is not the only hydraulic system that can produce this operation. In Figure 4 there is illustrated a modified hydraulic system for producing this operation wherein two pumps 79 and 80 are provided.

The pump 80 supplies fluid under pressure through the conduit 81 to the 4-way valve 20 for supply to the conduits 18 and 19 while the pump 79 supplies fluid under pressure through the conduit 82 to the 4-way valve 25 for supplying fluid under pressure through the conduits 23 and 24. Both pumps 79 and 80 may receive their supply of fluid from the reservoir 83 through the conduit 84.

The pump 80 is provided with a control mechanism 85 connected to the pressure conduit 81 by means of a conduit 86 while the pump 79 is provided with a control mechanism 87 that is connected to the pressure line 82 by means of the conduit 88. The control mechanisms 85 and 87 for the pumps 80 and 79, respectively, may be set to operate these pumps at different pressures whereby the pump 79 supplying fluid under pressure to the mold operating motor 22 can operate at a higher pressure than the pump 80 that supplies fluid under pressure to the injection plunger operating motor 17. The pumps 79 and 80 may be, of course, of the variable delivery constant pressure type of pump.

When the hydraulic system disclosed in Figure 4 is used in conjunction with the machine heretofore described the operation of the machine and system is the same as heretofore referred to.

While the apparatus hereinbefore disclosed and described constitutes a preferred form of the invention, yet, it is to be understood that various mechanical operations may be incorporated in the apparatus without departing from the spirit of the invention, and that all such modifications as fall within the scope of the appended claims are intended to be included herein.

Having thus fully described my invention what I claim as new and desire to secure by Letters Patent is:

1. A molding machine that includes in combination, an injection molding apparatus including a mold and injection means for forcing material into the mold, fluid motor means for operating said injection means to force plastic material from the injection apparatus into the mold associated therewith, fluid motor means for opening and closing the mold, a fluid power circuit operatively connected to both of said motor means for operating the same through an advancing stroke and a push-back stroke, a briquette forming apparatus constructed as an integral part of said injection apparatus consisting of a briquetting cylinder having an opening therein communicating with said injection apparatus through which briquettes are fed thereto and having a pair of plunger means therein operable in opposition to one another which feed briquettes formed therein into the injection apparatus through the said opening, independent fluid motor means for operating said pair of plunger means in said briquette forming apparatus to produce a briquette therein, means hydraulically connecting the push-back side of said fluid motor of said injection apparatus with one side of each of the pair of independent motor means for operating said independent motor means together to position said plunger means for receiving plastic material therebetween, and means hydraulically connecting the opposite side of each of said independent fluid motors with the push-back side of said mold operating fluid motor to actuate the same for compressing plastic material between said plunger means.

2. A molding machine that includes in combination, an injection molding apparatus including a mold and injection means for forcing material into the mold, fluid motor means for operating said injection means to force plastic material from the injection apparatus into the mold associated therewith, fluid motor means for opening and closing the mold, a fluid power circuit operatively connected to both of said motor means for operating the same through an advancing stroke and a push-back stroke, a briquette forming apparatus constructed as an integral part of said injection apparatus consisting of a briquetting cylinder having an opening therein communicating with said injection apparatus through which briquettes are fed thereto and having a pair of plunger means therein operable in opposition to one another which feed briquettes formed therein into the injection apparatus through the said opening, independent fluid motor means for operating said pair of plunger means in said briquette forming apparatus to produce a briquette therein, means hydraulically connecting the push-back side of said fluid motor of said injection apparatus with one side of each of the pair of independent motor means for operating said independent motor means together to position said plunger means for receiving plastic material therebetween, and means hydraulically connecting the opposite side of each of said independent fluid motors with the push-back side of said mold operating fluid motor to actuate the same for compressing plastic material between said plunger means and for feeding the compressed briquette formed between the plunger means into the injection apparatus during a continuous stroke of operation of said independent fluid motor means as caused by the pressure applied thereon from the push-back side of said mold operating motor.

3. A molding machine that includes in combination, an injection molding apparatus including a mold and injection means for forcing material into the mold, fluid motor means for operating said injection means to force plastic material from the injection apparatus into the mold associated therewith, fluid motor means for opening and closing the mold, a fluid power circuit operatively connected to both of said motor means for operating the same through an advancing stroke and a push-back stroke, a briquette forming apparatus constructed as an integral part of said injection apparatus consisting of a briquetting cylinder having an opening therein communicating with said injection apparatus through which briquettes are fed thereto and having a pair of plunger means therein operable in opposition to one another which feed briquettes formed therein into the injection apparatus through the said opening, independent fluid motor means for operating said pair of plunger means in said briquette forming apparatus to produce a briquette therein, means hydraulically connecting the push-back side of said fluid motor of said injection apparatus with one side of each of the pair of independent motor means for operating said independent motor means together to position said plunger means for receiving plastic material therebetween, means hydraulically connecting the opposite side of each of said independent fluid motors with the push-back side of said mold operating fluid motor to actuate the same for compressing plastic material between said plunger means, and a stroke control mechanism for regulating the stroke of one of said independent motor means interconnected with said injection apparatus for operation thereby to regulate the stroke of the said independent motor means in accordance with the quantity of plastic material ejected from the injection apparatus.

4. A molding machine including in combination, an injection apparatus for ejecting plastic material including a mold and an injection means for forcing material into the mold, fluid motor means for operating said injection means, fluid motor means for opening and closing said mold, a fluid power circuit for supplying fluid under pressure to both of said motor means to operate the same through an advancing stroke and a push-back stroke and including means for maintaining the push-back pressure on the motor means for operating the injection apparatus lower than the push-back pressure on the mold operating motor means, a briquette forming apparatus constructed as an integral part of said injection apparatus consisting of a briquetting cylinder having an opening therein communicating with said injection apparatus through which briquettes are fed thereto and having a pair of plunger means therein operable in opposition to one another which feed briquettes formed therein into the injection apparatus through the said opening, fluid motor means for operating said plunger means of said briquette forming apparatus, fluid conducting means for conducting fluid pressure applied to the push-back side of said motor for operating said injection apparatus to said last mentioned fluid motor means to position the briquette forming apparatus in position to receive a charge of material, and fluid conducting means for conducting fluid under pressure applied to the push-back side of said mold operating motor to the fluid motor means for operating said briquette forming apparatus whereby to overcome the fluid pressure applied to said motor means from the push-back side of said injection motor and cause forming of a briquette.

5. A molding machine including in combination, an injection apparatus for ejecting plastic material including a mold and an injection means for forcing material into the mold, fluid motor means for operating said injection means, fluid motor means for opening and closing said mold, a fluid power circuit for supplying fluid under pressure to both of said motor means to operate the same through an advancing stroke and a push-back stroke and including means for maintaining the push-back pressure on the motor means for operating the injection apparatus lower than the push-back pressure on the mold operating motor means, a briquette forming apparatus constructed as an integral part of said injection apparatus consisting of a briquetting cylinder having an opening therein communicating with said injection apparatus through which briquettes are fed thereto and having a pair of plunger means therein operable in opposition to one another which feed briquettes formed therein into the injection apparatus, independent fluid motor means for operating said opposed plunger means in said briquette forming apparatus for forming briquettes therein, fluid conducting means for supplying fluid under pressure applied to the push-back side of said injection motor means concomitantly to both of said independent motor means on one side thereof to operate the same and position said plunger means in spaced relationship to receive molding material therebetween, and fluid conducting means for supplying fluid under pressure applied to the push-back side of said mold operating motor to said independent motor means sequentially to operate said independent motor means to first compress molding material therebetween and then feed the compressed material into the injection apparatus.

6. A molding machine including in combination, an injection apparatus for ejecting plastic material including a mold and an injection means for forcing material into the mold, fluid motor means for operating said injection apparatus, fluid motor means for opening and closing said mold, a fluid power circuit for supplying fluid under pressure to both of said motor means to operate the same through an advancing stroke and a push-back stroke and including means for maintaining the push-back pressure on the motor means for operating the injection apparatus lower than the push-back pressure on the mold operating motor means, a briquette forming apparatus constructed as an integral part of said injection apparatus consisting of a briquetting cylinder having an opening therein communicating with said injection apparatus through which briquettes are fed thereto and having a pair of plunger means therein operable in opposition to one another which feed briquettes formed therein into the injection apparatus through the said opening, independent fluid motor means for operating said opposed plunger means in said briquette forming apparatus for forming briquettes therein, fluid conducting means for supplying fluid under pressure applied to the push-back side of said injection motor means concomitantly to both of said independent motor means on one side thereof to operate the same and position said plunger means in spaced relationship to receive molding material therebetween, fluid conducting means for supplying fluid under pressure applied to the push-back side of said mold operating motor to said independent motor means sequentially to operate said independent motor means to first compress molding material therebetween and then feed the compressed material into the injection apparatus, and a mechanism for controlling the stroke of one of said independent motor means connected with and operated by said injection apparatus to control the stroke of the said motor means in accordance with the stroke of the injection means and thereby regulate the quantity of molding material fed between said briquette forming plunger means upon each stroke of operation of the injection apparatus.

7. A molding machine including in combination, an injection apparatus for ejecting plastic material into a mold including an injection chamber in which plastic material is heated and a material receiving chamber in which fresh charges of plastic material are received, an injection plunger for transferring plastic material from the material receiving chamber to the injection chamber and ejecting plastic material from the injection chamber, means forming a briquetting chamber in which briquettes are formed under pressure completely independent of said injection chamber and material receiving chamber and disposed adjacent said material receiving chamber, passage means between said briquetting chamber and said material receiving chamber through which briquettes are transferred from the briquetting chamber to the material receiving chamber, and opposed plunger means operably traversing said briquetting chamber for briquetting plastic material therein and transferring the same to said passage means.

8. A molding machine including in combination, an injection apparatus for ejecting plastic material into a mold including an injection chamber in which plastic material is heated and a material receiving chamber in which fresh charges of plastic material are received, a mold associated with said injection chamber and including a fluid motor for operating said mold, an injection plunger for transferring plastic material from the material receiving chamber to the injection chamber and ejecting plastic material from the injection chamber, fluid motor means for operating said injection plunger, means forming a briquetting chamber disposed adjacent said material receiving chamber, passage means between said briquetting chamber and said material receiving chamber through which briquettes are transferred from the briquetting chamber to the material receiving chamber, fluid motor means for operating said briquetting plunger means, means hydraulically connecting the briquetting plunger motor means with the push back side of the injection plunger motor means to operate the briquetting plunger to receive a charge of plastic material concomitant with retraction of said injection plunger, and means hydraulically connecting said briquetting plunger motor means with the push back side of said mold operating motor to produce a briquetting operation by said briquetting plunger concomitant with opening of said mold.

9. A molding machine including in combination, an injection apparatus for ejecting plastic material into a mold including an injection chamber in which plastic material is heated for ejection therefrom and a material receiving chamber to receive fresh charges of plastic material, an injection plunger reciprocable in said material receiving chamber and said injection chamber, means forming a briquetting chamber in which briquettes are formed under pressure completely independent of said injection chamber and material receiving chamber and disposed adjacent said material receiving chamber and said injection chamber, a pair of opposed plungers means reciprocable in said briquetting chamber, passage means between said briquetting chamber and said material receiving chamber through which briquettes are transferred, a supply chamber disposed adjacent said briquetting chamber and communicating therewith, and means for reciprocating said briquetting plungers in said briquetting chamber to position them in spaced relationship beneath said supply chamber whereby to receive plastic material therebetween from said supply chamber, to apply pressure on the said material between said plungers and transfer the compressed material to said passage means for transfer into said material receiving chamber.

10. A molding machine including in combination, an injection apparatus for ejecting plastic material into a mold including an injection chamber in which plastic material is heated for ejection therefrom and a material receiving chamber to receive fresh charges of plastic material, an injection plunger reciprocable in said material receiving chamber and said injection chamber, means forming a briquetting chamber in which briquettes are formed under pressure completely independent of said injection chamber and material receiving chamber and disposed adjacent said material receiving chamber and said injection chamber, a pair of opposed plungers means both reciprocable in said briquetting chamber, passage means between said briquetting chamber and said material receiving chamber through which briquettes are transferred, a supply chamber disposed adjacent said briquetting chamber and communicating therewith, means for reciprocating both of said briquetting plungers in said briquetting chamber to position them in spaced relationship beneath said supply chamber to compress material therebetween and transfer the compressed material to said passage means for transfer into said material receiving chamber, and means actuated by movement of said injection plunger for regulating the position of one of said briquetting plungers to control the stroke thereof and determine the spaced relationship between said briquetting plungers to control the size of the briquette formed therebetween.

BERNARD D. ASHBAUGH.